United States Patent
Bott et al.

(10) Patent No.: US 7,277,380 B2
(45) Date of Patent: Oct. 2, 2007

(54) SYNCHRONIZATION OF AN ORTHOGONAL FREQUENCY DIVISION MULTIPLEXING (OFDM) RECEIVER

(75) Inventors: Rainer Bott, Andechs (DE); Karlheinz Pensel, Freising (DE); Dimitri Korobkov, Frankfurt (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1026 days.

(21) Appl. No.: 10/344,769

(22) PCT Filed: Jul. 2, 2001
(Under 37 CFR 1.47)

(86) PCT No.: PCT/EP01/07541

§ 371 (c)(1),
(2), (4) Date: Jun. 9, 2003

(87) PCT Pub. No.: WO02/15508

PCT Pub. Date: Feb. 21, 2002

(65) Prior Publication Data
US 2004/0057374 A1    Mar. 25, 2004

(30) Foreign Application Priority Data
Aug. 16, 2000    (DE) .................................. 100 39 902

(51) Int. Cl.
*H04J 11/00*    (2006.01)
(52) U.S. Cl. ...................... 370/203; 370/324; 370/350; 370/208; 375/260; 375/132
(58) Field of Classification Search ................ 370/203, 370/208, 324, 345, 350, 478, 480, 498, 503, 370/206
See application file for complete search history.

(56) References Cited

U.S. PATENT DOCUMENTS 5,652,772 A    7/1997    Isaksson et al.

(Continued)

FOREIGN PATENT DOCUMENTS

DE    37 85 670 T2    8/1993

(Continued)

OTHER PUBLICATIONS

Van De Beek et al., "Synchronization of a TDMA-OFDM Frequency Hopping System," IEEE, 1998, pp. 1290-1294.

(Continued)

*Primary Examiner*—Wing Chan
*Assistant Examiner*—Nguyen Ngo
(74) *Attorney, Agent, or Firm*—Ditthavong Mori & Steiner, P.C.

(57) ABSTRACT

A method for frequency and time synchronization of a receiver for receiving Orthogonal Frequency Division Multiplexing (OFDM) signals is described. A quality criterion of a OFDM signal is determined during one of the frequency intervals (hops) for each point of one of the two-dimensional frequency and time search areas. The area point having the optimum quality criterion ($\tau_x$, $f_x$) of the OFDM signal is then determined on the basis of said quality criterion, and the receiver is synchronized on the nominal frequency in view of the different between the nominal frequency ($f_0$) and the frequency value ($f_x$) corresponding to the optimum quality criterion. The OFDM signal may be demodulated and decoded starting with the time value ($\tau_x$) corresponding to the optimum quality criterion.

15 Claims, 2 Drawing Sheets

U.S. PATENT DOCUMENTS

| | | | |
|---|---|---|---|
| 5,732,113 A | | 3/1998 | Schmidl et al. |
| 5,802,117 A | | 9/1998 | Ghosh |
| 5,867,478 A | * | 2/1999 | Baum et al. ............... 370/203 |
| 6,058,101 A | | 5/2000 | Huang et al. |
| 6,954,481 B1 | * | 10/2005 | Laroia et al. ............... 375/132 |
| 6,961,364 B1 | * | 11/2005 | Laroia et al. ............... 375/132 |
| 7,012,882 B2 | * | 3/2006 | Wang et al. ................ 370/208 |
| 2005/0084023 A1 | * | 4/2005 | Bott et al. .................. 375/260 |

FOREIGN PATENT DOCUMENTS

| | | |
|---|---|---|
| DE | 43 19 769 C1 | 7/1994 |
| DE | 691 28 252 T2 | 5/1998 |
| EP | 0 296 175 B1 | 4/1993 |
| EP | 0 548 205 B1 | 11/1997 |
| EP | 0 915 597 A1 | 5/1999 |
| WO | WO99/44326 | 9/1999 |

OTHER PUBLICATIONS

Hung et al., "Joint Frequency and Symbol Synchronization Schemes for an OFDM System," Wireless Personal Communications, 1999, 309-317, vol. 10, Kluwer Academic Publishers, Netherlands.

Jordan et al., "Decoding Woven Convolutional Codes and Simulation Results," IEEE, 2000, p. 96, Sorrento, Italy.

Rohling et al., "Broad-Band OFDM Radio Transmission for Multimedia Applications," Proceedings of the IEEE, Oct. 1999, pp. 1778, vol. 87, No. 10, IEEE.

Mengali et al, Synchronisation Techniques for Digital Receivers, 1997, pp. 80-84, 91-93.

Host et al., "On Woven Convolutional Codes," http://www.it.lth.se/~ stefanh/thesis/, Ph D. Thesis, Lund University, 1999.

* cited by examiner

SYNCHRONIZATION OF AN ORTHOGONAL FREQUENCY DIVISION MULTIPLEXING (OFDM) RECEIVER

FIELD OF THE INVENTION

The invention relates to a method for frequency and time synchronization of a receiver for receiving OFDM signals, transmitted according to the frequency hop method in transmitting frequency intervals changing in hops.

BACKGROUND OF THE INVENTION

Orthogonal Frequency Division and Multiplexing (OFDM) systems are being applied in modern digital technology for data transmission. In this principle, before being transmitted a digital data stream is converted by mapping into complex-value symbols and split up into a multiplicity of partial signals, each of which is transmitted separately on an individual carrier. In the DVB-T (Digital Video Broadcasting) system 1,705 or 6,817 such individual carriers are used, for example. In the receiver these items of partial information are recombined into a whole item of information of the sender-side digital data stream. This OFDM system is known and is described in greater detail in, for example, HERMANN ROHLING, THOMAS MAY, KARSTEN BRUNINGHAUS and RAINER GRUNHEID, Broad-Band OFDM Radio Transmission for Multimedia Applications, Proceedings of the IEEE, Vol. 87, No. 10, October 1999, pp. 1778 ff.

In modern transmission technology via radio channels a frequency hop method is often applied to compensate fading intrusions in the channel, in which the useful information is transmitted in sending frequency intervals (hops), changing in hops, of, for example, only 5 ms duration.

If these two systems known per se are applied in combination and OFDM signals are transmitted via radio channels according to the frequency hop method, it must be ensured that the receiver is synchronized exactly in respect of frequency and time to the OFDM blocks transmitted in the individual hops. Owing to movement by sender and/or receiver or owing to differences in the frequency of sender and receiver, Doppler and frequency shifts of the individual carriers of the OFDM can arise, which, because of the frequency agility, are not constant, but change on each of the successive frequency intervals, corresponding to the speed of movement or the transmission frequency on the respective frequency interval. It is therefore necessary for the receiver to be synchronized exactly to the individual carriers of the OFDM signal in respect of frequency in each of the individual successive transmitting frequency intervals.

Moreover, care must be taken that the receiver is also synchronized in respect of time exactly to the start of the OFDM signal packets (OFDM blocks). Owing to differences in running time, for example as a function of the distance between sender and receiver, these OFDM blocks do not always arrive at the receiver at the same desired time.

SUMMARY OF THE INVENTION

It is therefore the object of the invention to provide a method for a receiver for receiving OFDM signals transmitted according to the frequency hop method, with which, without special synchronization sequences of the signal, this receiver can be synchronized to the OFDM signal in each frequency interval (hop), both in respect of frequency and in respect of time.

This object is achieved based on a method according to the preamble of the main claim by its characterising features. Advantageous further developments emerge from the subordinate claims.

According to the invention, in each frequency interval in a two-dimensional search phase before the actual demodulation and decoding of the OFDM signal in the receiver— based on an evaluation of the quality of the received OFDM signal in respect of frequency and time—the optimum quality criterion for this is determined and the receiver is then synchronized to this thus determined optimum quality criterion.

BRIEF DESCRIPTION OF THE DRAWINGS

The invention is described in greater detail below in an embodiment example using schematic drawings, in which.

DETAILED DESCRIPTION OF THE PREFERRED EMBODIMENT

Figure 1:
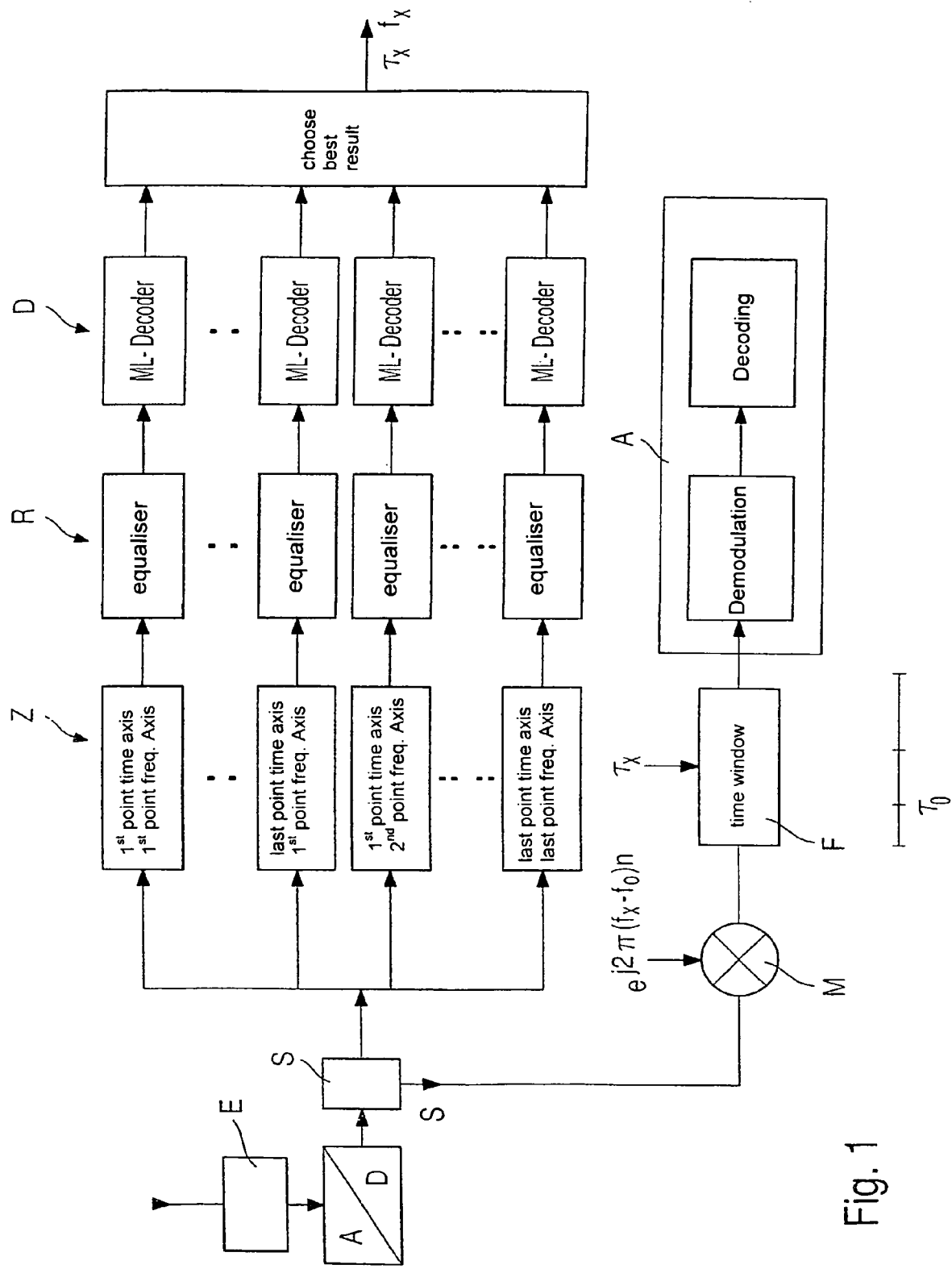
FIG. 1 is a block diagram of a high frequency receiver in accordance with one embodiment of the invention.
Figure 2:
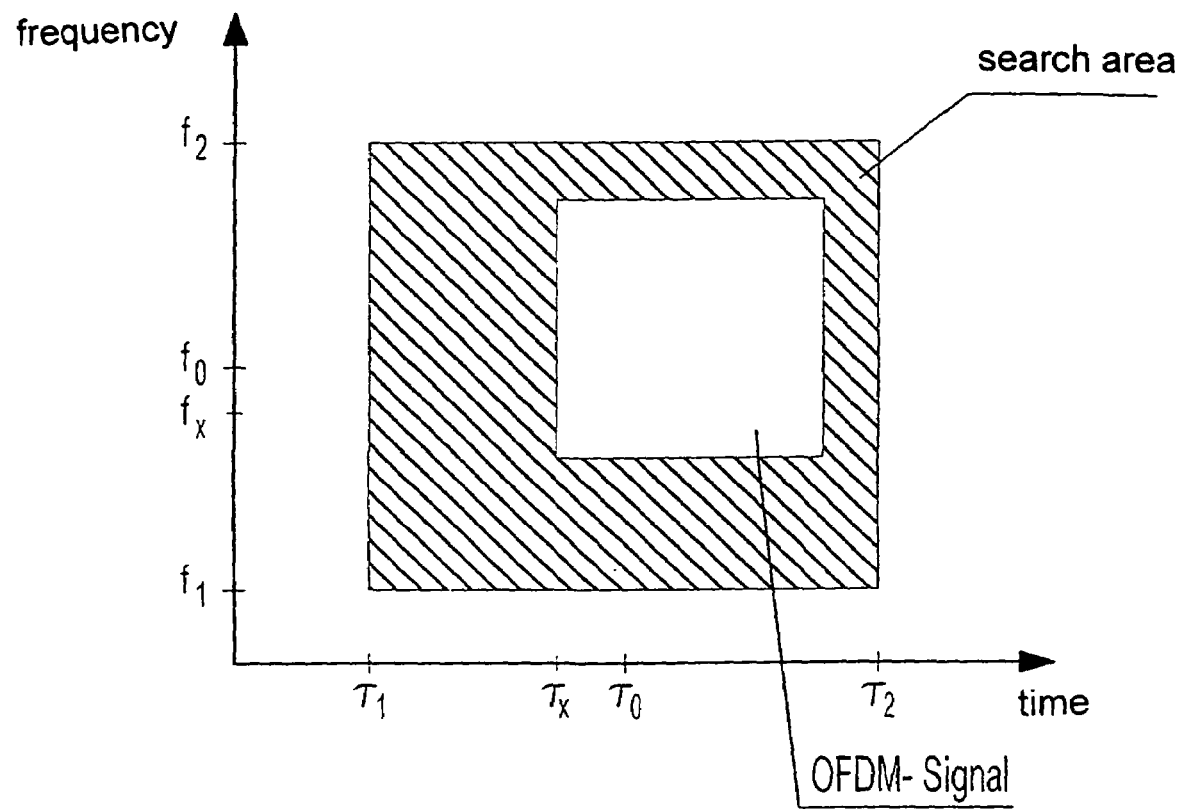
FIG. 2 is a graph showing a frequency search area.

FIG. 1 is a basic block diagram of a high frequency receiver for receiving OFDM signals transmitted according to the frequency hop method. The OFDM signal, received in the normal way by an analog high frequency receiving part E in sending frequency intervals changing in hops, is digitized in an analog-to-digital converter A/D and intermediately stored in a memory S. The receiving part E is constructed in the normal way as a frequency hop receiver. It knows the frequency hop pattern of the sender and automatically switches over, for example in the rhythm of, e.g. 5 ms, between the individual frequencies. A two-dimensional frequency and time search device Z is provided for digital signal processing of the OFDM signal, by means of which during a search phase, for example during a single transmitting frequency interval, the quality criterion of the received OFDM signal as regards frequency is established for each scanned value of the A/D converter in a predetermined frequency area $f_1$ to $f_2$, in which the nominal frequency value $f_0$ of the receiver lies. According to FIG. 2, the frequency search area between $f_1$ and $f_2$ therefore forms one of the dimensions of the two-dimensional search area. The other dimension of this search area is formed by a time search area between $\tau_1$ and $\tau_2$ with the nominal time start roof the OFDM signal. In this two-dimensional frequency and time search area $f_1$ to $f_2$ or $\tau_1$ to $\tau_2$ the quality criterion of the received OFDM signal is established in each case for each point. The step width with which the frequency area $f_1$ to $f_2$ is scanned depends on the type of OFDM signal and the maximum difference to be expected between nominal frequency position $f_0$ and actual frequency position $f_x$ of the signal. The step width in the time axis is established by the scanning rate of the A/D converter. The step width can be a multiple of a scanned value. In FIG. 2 the entire search area is illustrated as shaded.

The quality criterion of the OFDM signal during the search run is preferably established by a maximum likelihood estimation, in that the OFDM signal is demodulated and then evaluated in a maximum likelihood decoder D for each point of this frequency and time search area. A condition of this is that the code of the OFDM signal used is of such a kind that the ML decoder can carry out complete decoding for each sending frequency interval (hop). Preferably codes terminating on a hop are used, for example a BCH code or preferably also so-called woven codes with an outer code and an inner convolutional code linked to it, as described, for example, in Host, S. Johannesson, R. and Zyablov, V.: "A first encounter with binary woven convolutional codes", In. Proc. International Symposium on Communication Theory and Application, Lake District, UK, July 1997 or Host, S.: On Woven Convolutional Codes. Ph. D. Thesis, Lund University, 1999. ISBN 91-7167-016-5, http:www.it.lth.se/stefanh/thesis/. ML decoders of this kind have in their construction as so-called soft output decoders the property that, as well as the decoded bits, they also supply a quality criterion as the result of the decoding. In an ML decoder this quality criterion is generally the so-called distance between the input signal of the decoder and the decoded output signal of the decoder, usually in the form of the Euclidian distance. APP decoders are also suitable for this purpose, as they deliver as quality criterion of the received OFDM signals the a posteriori probability, a quality criterion which is also suitable for the purpose according to the invention.

After the quality criteria have been determined for each individual point of the search area, the point with the optimum quality criterion of both the frequency $f_x$ and the time $\tau_x$ is determined, as schematically indicated in FIG. 2 for the currently received OFDM signal. The only thing then still necessary is for the receiver to compensate this frequency difference between $f_x$ and $f_0$ and to further process the intermediately stored OFDM signal, starting with $\tau_x$. For this purpose the intermediately stored OFDM signal is multiplied in the time area by a complex oscillation, formed from the difference between the nominal frequency $f_0$ and the frequency $f_x$ for optimum quality criterion. In the time window selection F of the receiving channel the scanned values of the actual orthogonality interval of the received OFDM signal are demodulated and decoded in a digital evaluation device A, starting with $\tau_x$.

The search area must be chosen in such a way that the receiver can receive the hop of the sender correctly. After a first search run is complete, though the frequency and time are known approximately and the receiver is synchronized, owing to propagation conditions and movements of the sender and/or the receiver, slow drifts and fluctuations emerge, which also have to be compensated. As the position of the OFDM signal is known approximately, after the first search run during the subsequent normal tracking phase of the signal it is no longer necessary for the entire search area to be scanned for each hop, as with the preceding search process, but it is instead sufficient only to search in the vicinity of the previously determined optimum values and with the aid of the decoder again to establish the optimum and to track the receiver with it. As the optimum can gradually change, during this tracking phase the frequency and time value $f_x$ or $\tau_x$, determined on the basis of the optimum quality criterion, is tracked via an adaptive filter, a so-called Kalman filter preferably being used.

To support the search process a special synchronization sequence can be provided in the OFDM signal, e.g. in the form of a special bit pattern, transmitted for the search process during a hop, so, in addition to the quality criterion, a further synchronization criterion is also available to the receiver by comparing the bit pattern.

Instead of the maximum likelihood criterion of the decoder, in this case a direct maximum likelihood comparison between sent and received signal can also be carried out, as the transmitting signal is, after all, known in the receiver. This synchronization sequence can be sent both at the start of the transmission and periodically while the transmission is running.

The received and intermediately stored OFDM signal is generally equalized to a greater or lesser extent in the transmission channel. These equalizations can have effects on the two-dimensional search, i.e. the optimum of the quality criterion can be shifted by equalization of this kind. It is therefore advantageous to equalize the signal before the two-dimensional search evaluation. Provided for this purpose are the equalizers R according to FIG. 1, which are connected upstream the ML decoders and equalize the signals accordingly for each point of the search area. One possibility for equalization is to evaluate for this purpose the pilot signals transmitted with the OFDM signal, which are generally used for phase synchronization and according to the invention can additionally be used for equalization. As the phase positions of these pilot signals in respect of one another and their amplitudes are known, the static channel distortions can be determined in the known way. The equalizer R therefore obtains knowledge about the phase and amplitude response of the transmission channel between sender and receiver and can equalize the OFDM signal accordingly. This can be done, for example, in that each OFDM carrier is multiplied by a complex value corresponding to the amplitude and phase response of the transmission channel. If the OFDM carriers are modulated only by means of phase or frequency modulation, multiplication by a phase value obtained as the result of the estimation of the phase response of the transmission channel is sufficient. If the carrier is amplitude modulated, however, it is necessary to multiply by the inverse of the estimated amplitude response (division). With combined amplitude and phase modulation, as is the case, for example, for higher value QAM modulations, the carrier in question has to be divided by the complex estimated value of the transmission function of the transmission channel at the carrier frequency.

With this equalization with the aid of the pilot signals it is not the information of the entire OFDM signal that is used. As, after the first estimation and decoding of the OFDM signal, the decoded transmitted useful information and therefore also, as a result of knowledge of the code used, the test information of the OFDM signal is present in the receiver, more reliable information on the quality can be obtained by re-coding. The re-coded data signal can now be modulated into an OFDM signal again and a distance between the regenerated signal and the originally received signal can be determined again and this distance is then immediately a measurement for the amplitude and phase response of the transmission channel and in a second estimation can be used for estimating the channel instead of the channel information which has been received via the pilot signals. This is particularly advantageous in the tracking phase of the receiver. This double equalization, demodulation and decoding considerably increases immunity to interference.

The method according to the invention already allows full synchronization of the receiver after a single transmitting frequency interval (hop). The two-dimensional search process for determining the optimum quality criterion, including equalization, can, according to FIG. 1, take place parallel in several appropriate evaluation branches. Serial evaluation in succession for the individual points of the search area is also conceivable.

Instead of the above-described two-dimensional search, if the receiving frequency is known in the receiver and is constant, it is possible to search only in the time direction.

If the time synchronization is known in the receiver and constant, a search in the frequency area is sufficient.

What is claimed is:

1. A method for frequency and time synchronization of a receiver for receiving a Orthogonal Frequency Division and Multiplexing (OFDM) signal, transmitted according to a frequency hop method in frequency intervals changing in hops, comprising:

searching, during every frequency interval, a demodulated receiving signal step-by-step in a frequency search area ($f_1$ to $f_2$), in which a nominal frequency ($f_0$) of the OFDM signal lies, and step-by-step in a time search area ($\tau_1$ to $\tau_2$), in which a nominal start ($\tau_0$) of the OFDM signal lies, whereby for each point of the two-dimensional grid arising in the frequency and time directions a quality criterion of the OFDM signal is established, and the grid point with the optimum quality criterion is determined therefrom, establishing a difference between the nominal frequency ($f_0$) and the frequency value ($f_x$) corresponding to the determined optimum quality criterion and correcting a center frequency error of the OFDM signal with respect to the nominal frequency ($f_0$) based on the difference, thereby synchronizing the received signal with regard to frequency, and demodulating the OFDM signal that is decoded starting with the time value ($\tau_x$) corresponding to the determined grid point with the optimum quality criterion.

2. A method according to claim 1, wherein:
the quality criterion is established by a maximum likelihood estimation by means of a maximum likelihood decoder.

3. A method according to claim 2, wherein:
the distance between the OFDM signal at the input and the OFDM signal at the output of the maximum likelihood decoder is established as quality criterion.

4. A method according to claim 1, wherein:
the quality criterion is established by a posteriori probability estimation by means of an a posteriori probability (APP) decoder.

5. A method according to claim 1, wherein:
a coding of the OFDM signal is chosen in such a way and so that a decoder is used to determine the quality criterion by full decoding for each frequency interval.

6. A method according to claim 5, wherein:
the coding of the OFDM signal is terminated at the length of the frequency interval.

7. A method according to claim 1, wherein:
the OFDM signal is coded according to a woven code consisting of the linking of an outer and an inner convolutional code.

8. A method according to claim 1, wherein:
for frequency synchronization, the OFDM signal is multiplied by a complex oscillation corresponding to the difference between the nominal frequency value ($f_0$) and the frequency value ($f_x$) determined via the optimum quality criterion.

9. A method according to claim 1, wherein:
for synchronization of the receiver, a synchronization sequence in the form of a special bit pattern is transmitted and with the synchronization sequence the optimum quality criterion is determined.

10. A method according to claim 9, wherein:
the quality criterion is determined by a maximum likelihood comparison between a sent and received signal without using a decoder.

11. A method according to claim 1, wherein:
before detection of the optimal quality criterion, with the aid of the pilot signals transmitted in the OFDM signal the transmission function of the transmission channel is estimated for each carrier of the OFDM signal and the OFDM signal is equalized as a function thereof.

12. A method according to claim 11, wherein:
after determining of the optimum quality criterion, the OFDM signal is demodulated and decoded on the basis of the OFDM signal equalized by estimating the transmission function and further channel estimation and equalization, demodulation and decoding of the OFDM signal is subsequently carried out with the aid of this decoded OFDM signal.

13. A method according to claim 1, wherein:
after the first synchronization of the receiver, in a tracking phase a two-dimensional search for the optimum quality criterion is repeated within a reduced frequency and time search area and frequency and time values of the best optimum quality criterion gained therefrom are supplied for frequency tracking or time synchronization via an adaptive filter in each case.

14. A method according to claim 13, wherein:
the adaptive filter is a Kalman filter.

15. A method for frequency and time synchronization of a receiver for receiving a Orthogonal Frequency Division and Multiplexing (OFDM) signal, transmitted according to a frequency hop method in frequency intervals changing in hops, comprising:

searching, during every frequency interval, a demodulated receiving signal either step-by-step in a frequency search area ($f_1$ to $f_2$), in which a nominal frequency ($f_0$) of the OFDM signal lies, or step-by-step in a time search area ($\tau_1$ to $\tau_2$), in which a nominal start ($\tau_0$) of the OFDM signal lies, whereby for each point of the two-dimensional grid arising in the frequency and time directions a quality criterion of the OFDM signal is established, and the grid point with the optimum quality criterion is determined therefrom, establishing a difference between the nominal frequency ($f_0$) and the frequency value ($f_x$) corresponding to the determined optimum quality criterion and correcting a center frequency error of the OFDM signal with respect to the nominal frequency ($f_0$) based on the difference, thereby synchronizing the received signal with regard to frequency, and demodulating the OFDM signal that is decoded starting with the time value ($\tau_x$) corresponding to the determined grid point with the optimum quality criterion.

* * * * *